(12) United States Patent
Harsha et al.

(10) Patent No.: US 10,755,232 B2
(45) Date of Patent: *Aug. 25, 2020

(54) MANAGING CROSS-CHANNEL FULFILLMENT IMPACT WITHIN SHARED INVENTORY DEMAND SYSTEMS

(71) Applicant: International Business Machines Corporation, Armonk, NY (US)

(72) Inventors: Pavithra Harsha, White Plains, NY (US); Shivaram Subramanian, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,879

(22) Filed: Sep. 9, 2019

(65) Prior Publication Data

US 2020/0019922 A1    Jan. 16, 2020

Related U.S. Application Data

(63) Continuation of application No. 15/199,205, filed on Jun. 30, 2016, now Pat. No. 10,423,922.

(51) Int. Cl.
*G06Q 10/08* (2012.01)
*G06Q 30/02* (2012.01)

(52) U.S. Cl.
CPC ....... *G06Q 10/087* (2013.01); *G06Q 30/0201* (2013.01); *G06Q 30/0202* (2013.01)

(58) Field of Classification Search
None
See application file for complete search history.

(56) References Cited

U.S. PATENT DOCUMENTS 7,287,000 B2   10/2007   Boyd et al.
8,732,040 B1   5/2014    Prabhune et al.
(Continued)

OTHER PUBLICATIONS

Collado et al. "Estimating and Optimizing the impact of inventory on Consumer Choices in a Fashion Retail Setting", IESE Business School, University of Navarra, Barcelona, Spain, Submitted Apr. 6, 2016, pp. 1-26.
(Continued)

*Primary Examiner* — Leland Marcus
(74) *Attorney, Agent, or Firm* — Scully, Scott, Murphy & Presser, P.C.; Joseph Petrokaitis, Esq.

(57) ABSTRACT

System and method for omni-channel retailer operations that integrate a network of brick-and-mortar stores with their online channel. The system and method includes calibrating a demand model for both brick-and-mortar sales and on-line channels over which a product is sold, the calibrating based upon a cross-channel fulfillment-aware inventory effect. An omni-channel sales prediction and fulfillment model is then constructed based on the calibrated demand model. Using constructed linear demand and revenue models, a plan is generated to optimize one or more: allocating of the product across physical stores, partitioning of the product for sales, and pricing of the product. Customer choices are jointly modeled across channels to allow switching, and a ship-from-store (SFS) inventory effect feature only for brick choice is applied to capture asymmetry. Inventory decision variables are introduced into an omni-channel pricing formulation to manage SFS-effect induced non-convexity and specific reformulations applied to recover a linear MIP.

20 Claims, 5 Drawing Sheets

(56) References Cited

U.S. PATENT DOCUMENTS

| | | |
|---|---|---|
| 2013/0325596 A1 | 12/2013 | Ouimet |
| 2015/0100384 A1 | 4/2015 | Ettl et al. |
| 2016/0155137 A1 | 6/2016 | Harsha et al. |
| 2016/0283953 A1 | 9/2016 | Ettl et al. |
| 2017/0206541 A1 | 7/2017 | Deshpande et al. |
| 2017/0330211 A1 | 11/2017 | Deshpande et al. |
| 2017/0330218 A1 | 11/2017 | Deshpande et al. |
| 2017/0330266 A1 | 11/2017 | Deshpande et al. |

OTHER PUBLICATIONS

Caro et al., "Clearance Pricing Optimization for a Fast-Fashion Retailer", University of California, Los Angelos—Anderson School of Management, London Business School, Nov. 24, 2010, pp. 1-35.

Fuambeng, A Typology of multichannel shoppers based on shopping motivations and product category, Capella University, ProQuest Dissertations Publishing, Dec. 2015, 115 pages.

Chen et al., "Dynamic Pricing in a Dula-Market Environment", Naval Research Logistics 62.7; 2015 Wiley Periodicals, 2015, Oct. 2015; pp. 531-549.

Amornpetchkul, "Essays on Supply Chain Contracting and Retail Pricing", University of Michigan, ProQuest Dissertation Publishing, 2014; 3619611, 205 pages.

LIST of IBM Patents or Patent Applications Treated as Related.

MANAGING CROSS-CHANNEL FULFILLMENT IMPACT WITHIN SHARED INVENTORY DEMAND SYSTEMS

FIELD

The present disclosure relates generally to the field of retail supply networks, and particularly, to computers, and computer applications, and computer-implemented methods for managing cross-channel fulfillment impact within shared inventory demand systems.

BACKGROUND

In line with a recent revolutionary trend in the retailing industry, retail firms often adopt omni-channel strategies. In an omni-channel retail environment, a firm aims to provide a seamless experience for customers to access multiple channels in purchasing goods. For example, a customer may visit a retail store to physically browse items, and via an on-line sales infrastructure, then order online from the same retailer. Alternatively, a customer may order online but then pick up the purchased item at a retail store. In today's increasingly mobile world, where prices across a retailer's sales channels are available to customers, customers increasingly engage in channel-switching behavior due to differences in price cadences across channels.

Many retailers are making concerted strategic decisions to break down traditional boundaries between channels in the design of their retail supply chains. For example, retailers recognize their network of physical "brick-and-mortar" stores can also serve the purpose of a network of mini-warehouses to fulfill e-commerce sales. This is accomplished through multiple cross-channel fulfillment alternatives, including the retailer-initiated ship from store (SFS) option (i.e., the retailer opts to fulfill an e-commerce sale from one of its stores, which picks, packs, and ships the product to the customer's address) and the customer-initiated buy-online-pickup-in-store (BOPS) option (i.e., the customer chooses to pick up the product from a nearby store).

A hallmark of an omni-channel retail environment is that inventory is shared across channels, both from the customer's perspective and from the retailer's perspective. In the customer's perspective, he or she can choose a channel to purchase from based on the price and convenience. In the retailer's perspective, it has the ability to choose a channel to fulfill a transaction.

Figure 1A:
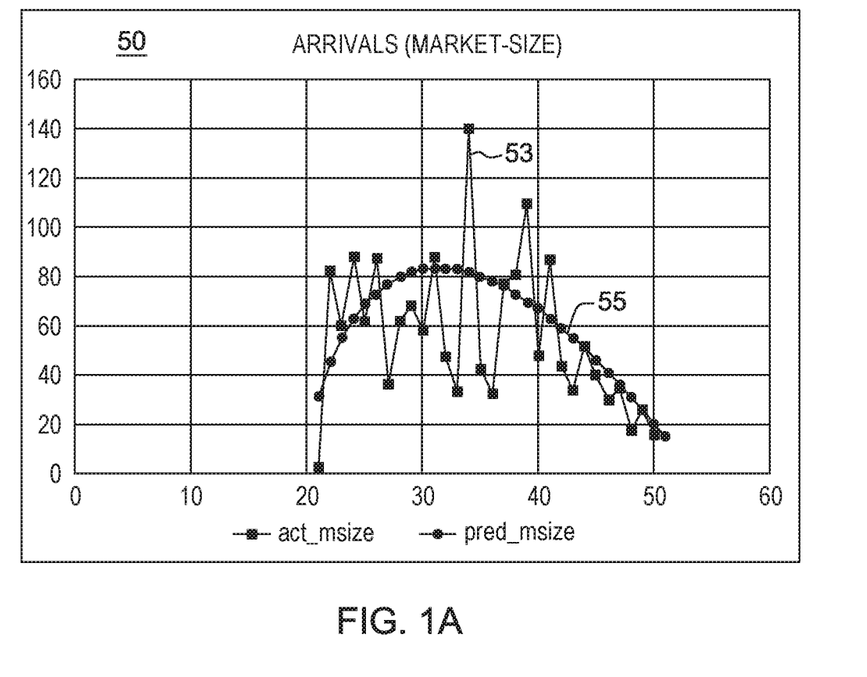
FIG. 1A shows a plot 50 of actual store arrivals (market size demand) vs. a prior predicted sales demand (market size) for an example product over a time span of weeks.
Figure 1B:
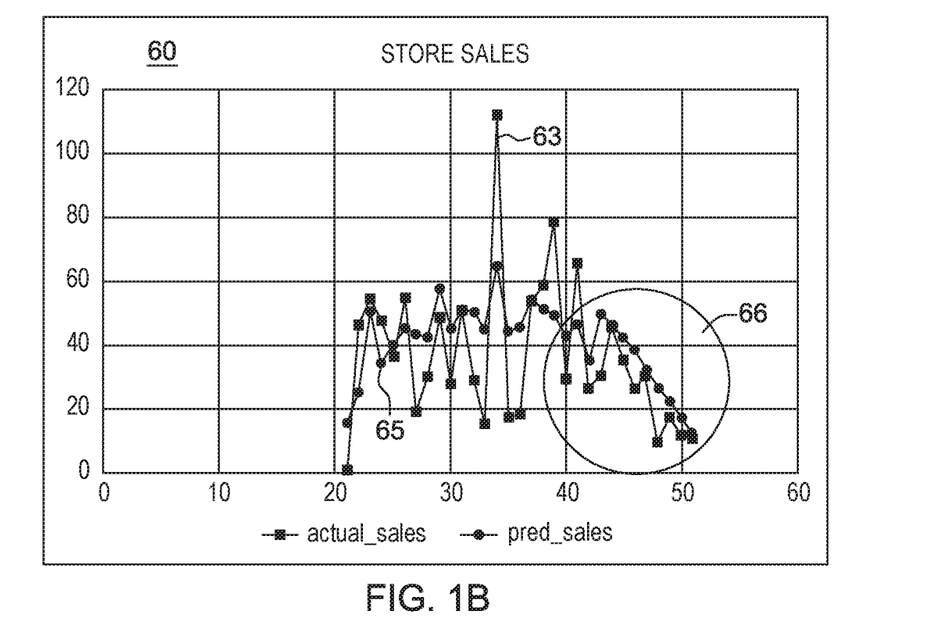
FIG. 1B shows an example plot of actual in-store sales vs. a prior predicted sales and illustrates the latent acceleration in brick sales decay of product sold by an example retailer due to SFS decisions.
Figure 1C:
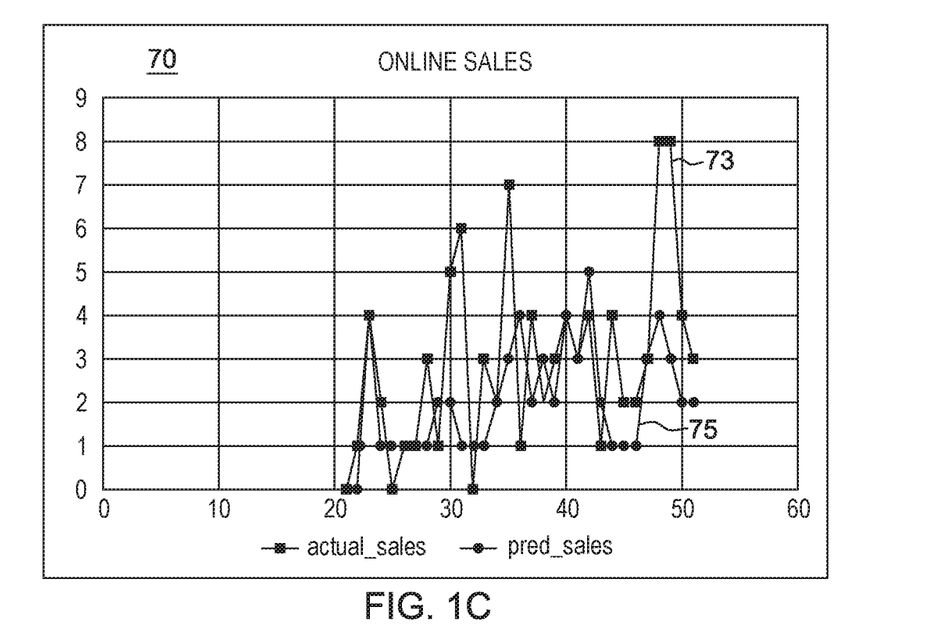
FIG. 1C shows an example plot depicting actual on-line sales vs. predicted on-line sales during a clearance period where customers increasingly switch to on-line sales channel.

Illustrative of a lifecycle demand profile for an electronic product sold by a retailer who uses SFS to fulfill online orders, FIG. 1A shows a plot 50 of actual store arrivals (market size demand) 53 vs. a prior predicted sales demand (market size) 55 for an example product over a time span of weeks 20-52 where the last 12 weeks represent a "clearance" period. As shown, towards the end of life of for short lifecycle items, sales are constrained by available inventory. Out-of-stock induces results in lost-sales opportunities as well as channel switching. This complicates predicted channel specific unconstrained demand, significantly impacting forecast accuracy which in turn results in poor downstream decisions such as markdown pricing. As shown in FIG. 1A, inventory "effects" is not the same as total unavailability (stock-outs). As shown in FIG. 1A, there is more than a predicted decline in the brick-and-mortar sales channel. FIG. 1B shows an example plot 60 of actual in-store sales 63 vs. a prior predicted sales 65 and illustrates at 66 the latent acceleration in brick sales decay of product sold by an example retailer, e.g., over a 12 week clearance period, due to SFS decisions. Moreover, during the clearance period, e.g., last 12 weeks shown in chart, customers increasingly switch to on-line channel as shown in the plot 70 of FIG. 1C depicting actual on-line sales 73 vs. predicted on-line sales 75. This SFS "inventory effect" is most prominent during the end of a selling season and by ignoring SFS cross-channel fulfillment impact, there may be systematic predicted overestimates of brick sales and underestimates online sales.

This complicates efforts to predict demands for the product, leading to mis-pricing and potential loss of revenue.

SUMMARY

A system, method and computer program product provides a novel demand estimation that accounts for switching behavior and lost sales and inventory constraints in omni-channel retail supply networks within a shared inventory demand including ship-from-store (SFS) effects for omni-channel fulfillment within a demand prediction and revenue management system for an omni-channel retailer.

Using the system and methods herein, a seller's revenue management system (RMS) may optimize prices and inventory over the selling season using ship-from-store (SFS) for omni-channel fulfillment. The method considers SFS impact on channel demand as being asymmetric, and also injects non-convexity into optimization. Incorporating SFS inventory effects improve demand prediction and price setting, in order to optimize profits/revenue.

In one aspect, there is provided a computer-implemented method for a network comprising multiple physical stores or warehouses configured for storing inventory of a product at distributed locations. The method comprises: receiving at a processor unit, historical sales transaction data related to sales of a product inventories at the one or multiple stores or warehouses; calibrating, using the processor unit, a demand model to forecast demand for each of one or more zones and each of one or more sales channels over which the product is sold, the calibrating based upon a cross-channel fulfillment-aware inventory effect; constructing an omni-channel sales prediction and fulfillment model for a period of time based on the calibrated demand model; and generating a plan specifying, using the processor unit, at least one of allocation of the product across physical stores, partitioning of the product for virtual sales, and pricing of the product based on the constructed omni-channel sales prediction and fulfillment model.

In a further aspect, there is provided a system. The system comprises: a network comprising multiple physical stores or warehouses configured for storing inventory of a product at distributed locations; a memory storage device; and a hardware processor in communication with the memory storage device, the hardware processor configured to: receive historical sales transaction data related to sales of a product inventories at one or multiple stores or warehouses; calibrate a demand model to forecast demand for each of one or more zones and each of one or more sales channels over which the product is sold, the calibrating based upon a cross-channel fulfillment-aware inventory effect; construct an omni-channel sales prediction and fulfillment model for a period of time based on the calibrated demand model; and generate a plan specifying at least one of allocation of the product across physical stores, partitioning of the product for virtual sales, and pricing of the product based on the constructed omni-channel sales prediction and fulfillment model.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

Embodiments are described in more detail in conjunction with the accompanying drawings, in which.

DETAILED DESCRIPTION

In an omni-channel retail environment, given the ability of customers to switch between channels, and because of the various available fulfillment options, the omni-channel environment presents difficulty with respect to predicting demand—which in turn affects deciding pricing and inventory.

As an example, an omni-channel retailer may include a chain selling short lifecycle products via multiple sales channels that share inventory in order to maximize revenue and reduce order fulfillment cost. According to this disclosure, a short-lifecycle product is an item for which a retailer has limited inventory, which may be spatially distributed across warehouses and physical stores. Examples of a retail chain selling short lifecycle products may include a fast-fashion item having a product lifecycle only lasting about 12-15 weeks, a seasonal fashion item having a life-cycle lasting up to 32 weeks. Hi-tech electronic device technology life-cycles are also getting shorter.

Such retail chains may exhibit inventory depletion problems as a consequence. That is, a fixed amount of inventory is produced pre-season, and depleted over its lifetime using multiple sales channels across locations, employing pricing and revenue management planning tools.

Given the backdrop that on-line orders fulfilled via SFS depletes in-store inventory at a location, it is understood that store inventory can deplete much faster than the store sales rate. Assortments are broken earlier than expected further decreasing store sales rate. It is additionally recognized that the SFS effect is asymmetric in its impact: directly affecting walk-in customers but not online orders. Online sales is largely unconstrained due to SFS option (limited only by total inventory); and channel switching not only on price but also store assortment quality. Broken assortments result in no-purchase or store customer switch to online channel.

Thus, in aspect, there is provided a system and method for improving omni-channel revenue management, comprising use of a cross-channel fulfillment aware demand prediction method, and a cross-channel fulfillment aware pricing and inventory optimization method. In one aspect, the system and methods calibrate a cross-channel inventory effect function to predict demand for each sales channel at a location. The system employs a specialized piecewise linearization method for calculating the cross-channel inventory effect on demand that is practically robust by being able to automatically handle a variety of input specifications for demand prediction functions and SFS inventory effect formulations.

In one embodiment, the present disclosure makes use of and expands the disclosure of commonly-owned, co-pending U.S. patent application Ser. Nos. 14/669,273 and 14/745,489 entitled DEMAND-SUPPLY MATCHING WITH A TIME AND VIRTUAL SPACE NETWORK the whole contents and disclosure of which is incorporated by reference as if fully set forth herein.

Figure 2:
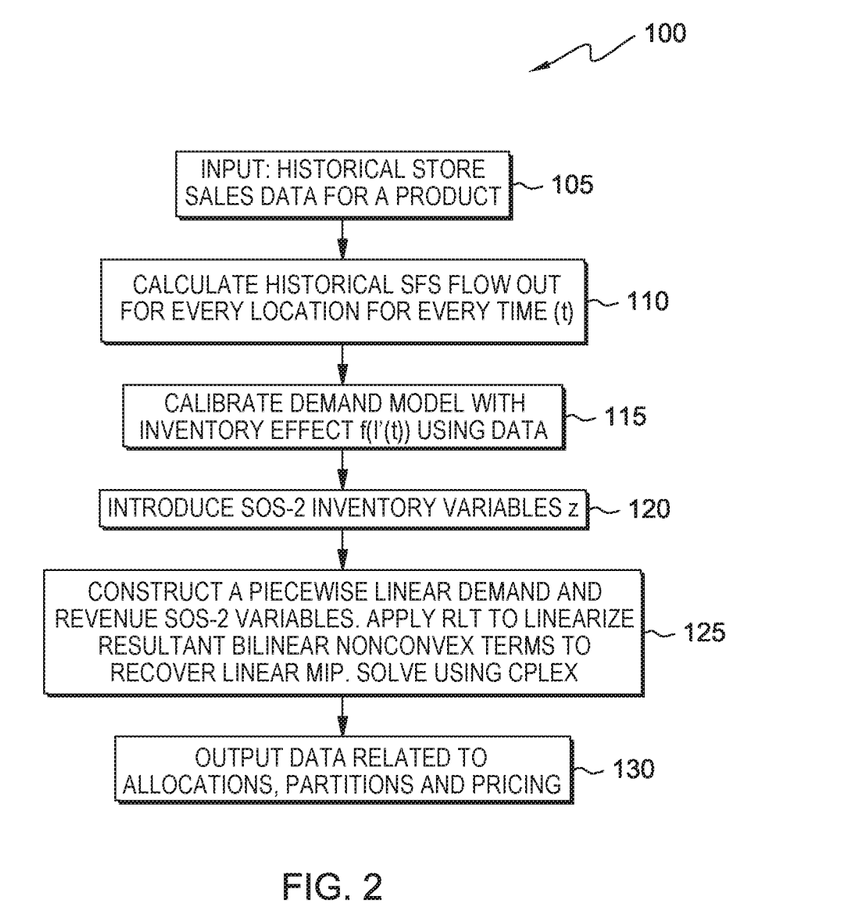
FIG. 2 is a block diagram of a planning method 100, according to some embodiments of this disclosure.

FIG. 2 is a block diagram of a planning method 100, according to one embodiment of this disclosure. The planning methods 100 may estimate a demand for a product, e.g., represented as a stock-keeping unit (SKU), that addresses the SFS phenomena and presence of customer switching, and which may enable an omni-channel retailer to determine how to price, allocate, and partition inventory, such as inventory for a short-lifecycle product.

In one aspect, a system and method provides techniques to incorporate cross-fulfillment effects to improve demand prediction and revenue optimization such that overall system profitability may be increased. In one embodiment, the system and method is described with respect to an example use case: i.e., OCPi (omni-channel) demand prediction and optimization.

The methods of the present disclosure address this problem in two key ways: 1) by jointly modeling customer choice across channels to allow switching, but apply a SFS inventory effect feature only for brick choice to capture asymmetry; and 2) by introducing inventory decision variables in the OCPi formulation to manage SFS-effect induced non-convexity and apply a specific reformulation to recover a linear MIP. In one embodiment, the SFS inventory effect can be specified using a variety of parametric functional forms or look-up tables.

A first example of an SFS inventory effect specified as a parametric form is the logarithmic function, and a second example of a parametric form is the threshold step function. As an alternative approach, the specifying of functions is avoided, and a table of discrete numerical values is provided that specifies the inventory effect value for every inventory level. For example, if (i,f) is a pair of numbers representing the ratio of current inventory to starting inventory, and the inventory effect: then the example table would appear as follows:

(0.0, −1.0)

(0.1, −0.7)

...

...

(0.5, −0.2)

...

...

(0.8, −0.1)

-continued (0.9, 0.0)

(1.0, 0.0)

It is noted that an inventory effect when active, has a depressing (negative) impact on the attractiveness of a sales channel to a customer, inducing a fraction of the customers to switch and shop in more attractive channels.

The method of FIG. 2 better predicts a product demand that accounts for the "inventory effects" wherein there is typically exhibited a marked decline in product sales at a brick-and-mortar store location, yet an increase in their on-line sales (a switching factor), e.g., during the clearance period or end of product lifecycle. In the method, there is assumed an initial or starting inventory amount or level I(t) at the brick-and-mortar store location at a start time, e.g., beginning of the week in a store.

In one embodiment, as shown in FIG. 2, at 105, the system receives input data related to a product. In some embodiments, this product may be a group of products being considered as a unit. The input data related to the product may include, for example, transaction data, physical (i.e., brick-and-mortar) stores and warehouse locations, sales time-series data, inventory time-series data, fulfillment history, product UPC, unit cost, return rates, customer demographic data including billing and shipping zip codes, prices, promotions, holiday events, weekly seasonality profiles, and competitor price time-series data.

Continuing at step 110, the method 100 calculates a historical SFS flow out of every location for every time (t).

Measuring Impact of Inventory Availability on Channel Demands

In one embodiment, a specific class of the demand model, i.e., the Attraction demand model incorporating commonly used demand functions, is used to model consumer choices. This model may be embodied as a multinomial logit (MNL) demand model or a multiplicative competitive interaction (MCI) demand model. The corresponding attraction demand functions are used to model consumer demand, and more specifically, model the purchase decision or the choice of a consumer.

In particular, the consumer demand model is configured according to:

$$D_{mz}^t(Y_z^t, X_z^t) = \frac{MarketSizeinlocation}{z \, at \, time \, t} * \frac{MarketShareofchannelm}{andlocationzattimet} \quad (1)$$

$$= \tau(Y_z^t) \frac{f_m(X_{mz}^t)}{1 + \sum_{m' \in \{b,e\}} f_{m'}(X_{m'z}^t)} \quad \forall m \in \{b, e\}, t \in T, z \in Z \quad (2)$$

where the channel m can be either the brick-and-mortar ("brick") b (e.g., a physical retail store or warehouse) or the e-commerce channel e, the set T is the set of times in the horizon and Z the set of selling locations. Here, $\tau(Y_z^t)$ is the market size model in location z that outputs the measure of consumers interested in any of items at time t as a function of a vector of the market size attributes $Y_z^t$ at time t, $f_m(X_{mz}^t)$ is the attraction model of channel m as a function of the vector of attributes $X_{mz}^t$ for channel m at time t, and, $X_z^t$ is the matrix of attributes for zone at time t where row m corresponds to $X_{mz}^t$.

The market size model $\tau(Y_z^t)$ models the measure of consumers interested in the products. They capture higher level attributes of products that impact the arriving traffic such as time effects (seasonality, trend and holiday) or the marketing campaign effects for the entire product group. This function can be captured as a linear, exponential or a power function of the attributes $Y_z^t$ (for example, $$\tau(Y_z^t) = e^{\gamma_z^T Y_z^t})$$

whose prediction coefficients ($\gamma_z$, in the example) have to be estimated.

Market share, also commonly referred to as the purchase/choice probability, models how consumers choose between different choices including a no-purchase option. Market share depends on the attraction model of all the available choices (including a "no purchase" which has a default value of 1). For any choice m, the attraction model is typically a function of the attributes $X_{mz}^t$ at time t and location z includes the price, inventory availability, promotion, multiples (e.g., sell in packs versus single units) and other observable factors that depend on the specific choice m. In the case of the MNL demand model, $$f_m(X_{mz}^t) = e^{\beta_{mz}^T X_{mz}^t},$$

in the case of the MCI demand model, $$f_m(X_{mz}^t) = \prod_k X_{mztk}^{\beta_{mzk}},$$

and in the case of a linear attraction demand model $f_m(X_{mz}^t) = \beta_m^T X_{mz}^t$ where $\beta_{mz}$ are the prediction coefficients that need to be estimated.

An attraction demand model is often chosen to model consumer choice even at an aggregate segment level, in addition to modeling the willingness to buy of an individual because it has fewer coefficients that are needed to be evaluated compared to its counterparts. In particular, the number of coefficients in the attraction demand model is O(M) for M choices as opposed to $O(M^2)$ in demand models such as linear, exponential or power. The structural form of an attraction demand model also makes it a viable demand modeling alternative for downstream multi-item pricing and assortment optimization applications.

In the embodiment of the present disclosure, there is modeled the impact of inventory levels on channel demand. So, one of the main causal variables in the channel attraction models is an inventory availability factor. In the omni-channel context, customers observe inventory levels in brick stores. As inventory level in the brick store drops, it impacts the sales due to presentation reasons (e.g., referred to as "broken assortment effect") and there is a natural decay of brick sales at the location level. In the omni-channel context, retailers use ship-from-store (SFS) fulfillment wherein the e-commerce demand at any location is fulfilled by sourcing the order from any location in the network, in particular, physical stores. It is observed that the online share tends to increase when the inventory levels are low and that there is a latent acceleration in brick sales decay due to SFS fulfillment decisions of the retailer. This asymmetric behavior in the two channels is because on one hand e-commerce inventory is curtailed only when the system wide inventory drops whereas the store demand decreases as soon as the store inventory is depleted.

This is modeled as follows. Letting $I_{bz}^t$ be the inventory in a brick location z at the beginning of a time t, the method denotes the SFS fulfillment decisions, amount of inventory going out of location z at time t by $SFS_{zt}$. Therefore the net inventory available is $\hat{I}_{bz}^t = I_{bz}^t - SFS_z^t$. Possible embodiments of the inventory availability causal factor (an SFS inventory effect function) in the channel attraction models (i.e., for one of the variables in $X_{bz}^t$) are $$h(x) = \log\left(\varepsilon + \frac{x}{I_o}\right), \text{ or } \min\left\{0, \frac{x}{I_o} - 1\right\}$$

where $x = \hat{I}_{bz}^t$, e is a small constant (e.g., 0.01) and $I_o$ is a predetermined inventory level. For example, in the former case, $I_o$ can be the inventory in the beginning of the season and in the latter case a predetermined threshold (e.g., 10%) of this starting inventory. It is noted that the SFS inventory effect can be specified using a variety of parametric functional forms or look-up tables.

In one embodiment, inventory availability causal factor h(x) is chosen so that it is negative. When all the other causal are given, e.g., including price, the respective channel demands for an MNL model are as follows:

$$D_{mz}^t(\hat{I}_{bz}^t) = \tau_z^t \frac{\exp(\overline{A}_{mz}^t)}{1 + \exp(\overline{A}_{bz}^t) + \exp(\overline{A}_{ez}^t)} \quad \forall m \in \{b, e\} \tag{3}$$

where $$\overline{A}_{bz}^t = A_{bz}^t + \beta_{bz} h(\hat{I}_{bz}^t) \tag{4}$$

$$\overline{A}_{ez}^t = A_{ez}^t \tag{5}$$

Thus, referring back to block 115, FIG. 2, there is further performed a step of calibrating the demand model with an "inventory effect" function h(x) that is channel-specific, i.e., $x = \hat{I}_{bz}^t$. In this expression, h(.) is a thresholding function and may be a logarithmic function or step function, however, any of a variety of SFS effect thresholding functions can be used. From the prediction standpoint, SFS orders (e.g., resulting from on-line sales) for that product are being subtracted from the inventory level, i.e., $$\hat{I}_{bz}^t = I_{bz}^t - SFS_z^t$$

where $I_{bz}^t$ is the starting inventory level; and $SFS_z^t$ is the ship-from-store function.

In one embodiment, the computer system examines all historical transaction data and particularly examines online orders and counts how many of them came out of a store for any given time period, e.g., a week. This output flow provides a historical SFS counts used in the calibration.

In one embodiment, the demand model accounts for channel attractiveness, A(t), and the method for modeling channel attractiveness computes a modified channel attractiveness A'(t) addressing the inventory effect function.

Thus, after computing the method computes $\hat{I}_{bz}^t = I_{bz}^t - SFS_z^t$, there is further computed:

$$\overline{A}_{bz}^t = A_{bz}^t + \beta_{bz} h(\hat{I}_{bz}^t), \text{ and}$$

$$\overline{A}_{ez}^t = A_{ez}^t$$

where $A_{bz}^t$ is an initial or starting Attractiveness level for a particular physical store (e.g., brick-and-mortar) sales channel; and $\overline{A}_{ez}^t$ and $A_{ez}^t$ are the Attractiveness level for the on-line (web-based) sales channel. The coefficient $\beta_{bz}$ relates to a product and is estimated to model sensitivity of channel attractiveness to inventory level of that product (i.e., how likely is a customer is going to switch channel from brick-and-mortar sales channel to an online sales channel).

In one embodiment, the numerical coefficient $\beta_{bz}$ is calculated during the demand model calibration procedure and represents the sensitivity of the channel to the 'inventory effect' for a given product. Coefficient $\beta_{bz}$ can vary from product to product and by retailer to retailer, depending, among other things, on how the product is viewed and purchased by a customer. For example, some retailers may just keep a demo version in the aisle and the actual product in the backroom of the store. Other retailers place the actual product in the aisle. Each approach may result in a different sensitivity coefficient.

Using channel attractiveness sensitivity coefficient $\beta_{bz}$, the calibrated model will account for a reduced attractiveness level of one channel and a resulting effective increase in the desirability of the other channel according to equation 3):

$$D_{mz}^t(\hat{I}_{bz}^t) = \tau_z^t \frac{\exp(\overline{A}_{mz}^t)}{1 + \exp(\overline{A}_{bz}^t) + \exp(\overline{A}_{ez}^t)} \quad \forall m \in \{b, e\}$$

This resulting predicted demand thus takes into account customer switching between on-line order or brick-and-mortar store channels.

To estimate this demand model requires the solution of a non-convex mathematical formulation. Standard gradient-based techniques do not yield good quality solutions, while other known techniques like Expectation-Maximization (EM) are known to converge very slowly.

Thus a solution is required that can calculate near-optimal solutions in a reasonable enough run time in order to be useful to the business. In one embodiment, a method proposed in commonly-owned, co-pending U.S. patent application Ser. No. 14/556,294 entitled DEMAND FORECASTING IN THE PRESENCE OF UNOBSERVED LOST SALES is implemented. Commonly-owned, co-pending Ser. No. 14/556,294 is incorporated by reference as if fully set forth herein.

To be able to use the calibrated demand model $D_{mz}^t(\hat{I}_{bz}^t)$ for predictions, the expected SFS value is needed for the next time period, e.g., 1-12 weeks in the future. In other words, even if all future causal variables (other than inventory availability) are known, future demands still cannot be adequately predicted since the inventory levels at locations that is available to satisfy walk-in customer requests (since the inventory is shared between sales channels, part of the inventory is used for SFS) are not known. Calculating the expected values of future SFS at a location cannot be done independently for each location, since any location's inventory can be used to satisfy ecommerce demand at any other location. A model to jointly predict demand and determine the SFS across all locations in the presence of inventory effects is thus implemented.

Model for the Omni-Channel Sales Prediction and Fulfillment Optimization with Inventory Effects A general model for optimizing channel prices and cross-channel inventories of an omni-channel retailer selling finite inventory over a finite horizon is now provided according to equation 6).

$$\max_{s,w} \sum_{z \in Z, t \in T} \left[ p_e^t S_{ez}^t + \sum_{l \in \Lambda_z} p_{bz}^t S_{bl}^t \right] + q \left( \sum_{j \in W} Y_{ej} + \sum_{z \in Z} I_{bz}^{|T|} \right) - \qquad (6)$$

$$\sum_{j \in W, z \in Z, t \in T} c_{(j,z)} S_{e,(j,z)}^t - \sum_{z,z' \in Z, t \in T} c_{(z',z)} S_{e,(z',z)}^t$$

$$\text{subject to, } S_{bz}^t \le D_{bz}^t(Y_{bz}^t) \forall z \in Z, t \in T \qquad (7)$$

$$\sum_{t \le \tau} \left[ S_{bz}^t + \sum_{z' \in Z} S_{e,(z,z')} \right] + Y_{bz}^t = x_{bz} \forall z \in Z, t \in T \qquad (8)$$

$$S_{ez}^t \le D_{ez}^t(Y_{bz}^t) \forall z \in Z, t \in T \qquad (9)$$

$$S_{ez}^t = \sum_{j \in W} S_{e,(j,z)}^t + \sum_{z' \in Z} S_{e,(z',z)} \forall z \in Z, t \in T \qquad (10)$$

$$\sum_{t \in T} \sum_{z \in Z} S_{e,(j,z)}^t + Y_{ej} = x_{ej} \forall j \in W \qquad (11)$$

$$S, I, Y \ge 0 \qquad (12)$$

Table 1 below depicts a notation for the omni-channel price optimization model.

TABLE 1

| | |
|---|---|
| Indices | |
| j, z, t, | a e-commerce fulfillment center (EFC), a location, a week, |
| e, b, | the e-commerce channel, the brick-and-mortar channel, |
| Sets | |
| W, Z, T, | all EFC, all locations, all weeks, |
| Parameters | |
| $x_{bz}$, $x_{ej}$, | initial inventory at location z, initial inventory at EFC, |
| $c_{(e,z)}$, | per-unit cost from fulfilling an e-commerce order by location z customers using EFC j inventory, |
| $c_{(z',z)}$, | per-unit cost from fulfilling an e-commerce order by location z customers using z' inventory, |
| q, | per-unit salvage value for inventory leftover after the final week, |
| $p_{bz}^t$, | brick-and-mortar price at location z, week t, |
| $p_e^t$, | e-commerce price at week t, |
| Decision Variables | |
| $S_{bz}^t, S_{ez}^t$, | fulfilled brick-and-mortar, e-commerce demand from location z on week t, |
| $S_{e,(j,z)}^t$, | fulfilled e-commerce demand for location z on week t using EFC j inventory, |
| $S_{e,(z',z)}^t$, | fulfilled e-commerce demand for location z on week t using z' inventory, |
| $Y_{ej}$, | leftover inventory in the EFC j after the final week, |
| $I_{bz}^t$, | leftover inventory in location l at time t. |

In one embodiment, the model depicted in equation 6) is a large-scale optimization problem for retail chains that have thousand or more locations in their network. Furthermore, this is also a non-convex mathematical formulation due to the nonlinearity of the inventory effect function (e.g. the $D_{mz}^t(Y_{bz}^t)$ are non-linear functions of left over inventory $Y_{bz}^t$), and standard network flow algorithms that converge quickly cannot be employed.

Thus, as depicted at step 120, FIG. 2, the model is reformulated as a mixed integer linear program which can be solved tractably using commercial off-the-shelf MIP solvers such as IBM ILOG CPLEX. That is, the method includes transforming this nonlinear problem of the model into an mixed-integer program by introducing the following constraints $$Y_{bz}^t = \sum_k \bar{Y}_k u_{zk}^t \qquad (13)$$

$$u_{zk}^t \, SOS2 \qquad (14)$$

and replace the right hand side of equation 7) (brick sales) and equation 9) (onlinesales) with the following:

$$D_{mz}^t(Y_{bz}^t) = \sum_k D_{mz}^t(\bar{Y}_k) u_{zk}^t \quad m \in \{e, b\} \qquad (15)$$

where the $u_{zk}^t$ are SOS-2 variables inventory decision variables introduced to manage the non-convexity injected by SFS inventory effect on the demand model predictions. In one embodiment, a piecewise linear model is agnostic to, and can be used to manage any SFS effect function h(.) Further, computationally efficient and practical methods are performed for SFS effect formulation.

Then at 125, FIG. 2, the optimization model of equation 6) is solved using a parallel processing solver. In one embodiment, a CPLEX MIP solver may be used to solve the optimization model using the SOS-2 variables. That is, problem can be solved using MIP solver, e.g., an IBM ILOG$^{SM}$ solver. Such an implementation provides a specialized piecewise linearization method for calculating the cross-channel inventory effect on demand that is practically robust by being able to automatically handle a variety of input specifications for demand prediction functions and SFS inventory effect formulations.

Once this MIP is solved, there is obtained as output the future demand predictions, as well as the inventory flows. That is, at 130, FIG. 2, the planning system may output data related to at least one of allocations, partitions, and pricing of the product, e.g., during the "clearance" period.

In some practical situations, the future prices at stores and the ecommerce channel may also be variable (unknown) and not fixed at a pre-determined value. In such a situation, the resultant optimization module jointly calculate prices, SFS and demands at every location. This can be achieved by adding additional methods using reformulation and linearization technique (RLT) that linearize the combined effects of price and inventory variables. For example, when prices $p_e^t$ are variable, the RLT technique is implemented to linearize the resultant bilinear products terms.

It is understood that the above-described omni-channel price optimization model has been described for a two-channel situation where a retailer operates an ecommerce channel and a brick-and-mortar store channel. However, this method is widely applicable to and is practically useful where a seller operates multiple sales channels across multiple locations and allows inventory to be shared across these channels. For example, a seller who operates multiple channels (mobile, social networking storefront, telephonic orders, catalog sales, etc.) in additional to physical outlets for walk-in customers.

Figure 3:
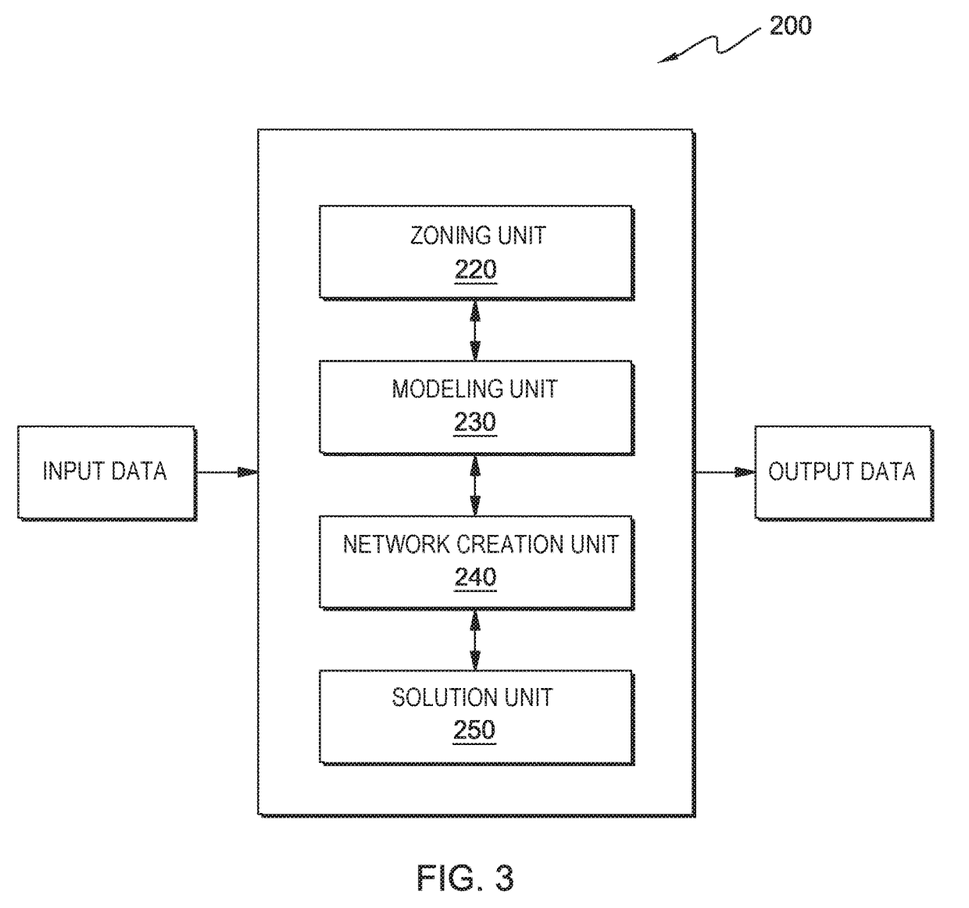
FIG. 3 is a block diagram of a planning system according to one embodiment of the disclosure.

FIG. 3 is a block diagram of a planning system 200, according to one embodiment of this disclosure. The planning system 200 may determine for a retailer how to price, allocate, and partition inventory, such as inventory for a short-lifecycle product. According to this disclosure, a short-lifecycle product is an item for which a retailer has limited inventory, which may be spatially distributed across warehouses and physical stores. Further, "allocation" refers to the allotment of inventory to a certain location or zone, and "partition" refers to a portion of inventory at a brick-and-mortar location that is reserved for virtual sales channels (e.g., online sales).

As shown in FIG. 3, input data related to a product may be input into the planning system 100. In some embodiments, this product may be a group of products being considered as a unit. The input data related to the product may include, for example, transaction data, physical (i.e., brick-and-mortar) stores and warehouse locations, sales time-series data, inventory time-series data, fulfillment history, product UPC, unit cost, return rates, customer demographic data including billing and shipping zip codes, prices, promotions, holiday events, weekly seasonality profiles, and competitor price time-series data. The transaction records in the input data may be geo-tagged. For example, and not limitation each transaction in the transaction data may be associated with a zip code or other location data indicating a location from which the customer made the transaction. For further example, the location data may indicate a brick-and-mortar store or, in the case of an online transaction, the customer's home or mobile device. For example, in the latter case, the location data may include the billing or shipping zip code, or both, for the online transaction.

The planning system 200 may include various operational units, which may each be made up of hardware, software, or a combination of both.

For example, these operational units may include a zoning unit 220, a modeling unit 223, a network creation unit 240, and a solution unit 250. Generally, the zoning unit 220 may use some or all of the input data to create geographical sales regions, also referred to herein as zones; the modeling unit 230 may use a demand model based on historical sales to estimate sales of the product; the network creation unit 240 may create a dynamic time-and-virtual-space (TVS) network using the established zones and the demand model such as described in applicants commonly-owned, co-pending U.S. patent application Ser. Nos. 14/669,273 and 14/745,489 entitled DEMAND-SUPPLY MATCHING WITH A TIME AND VIRTUAL SPACE NETWORK; and the solution unit 250 may determine pricing, allocations, and inventory based on the TVS network.

It will be understood that, although these operational units are shown as distinct components in FIG. 3, this distinction is made for illustrative purposes only. These units may include overlapping hardware, software, or both, or may be further divided based on implementation preferences.

As further shown in FIG. 3, the planning system 100 may provide output data indicating how to price, allocate, and partition inventory of the product.

The planning system 100 may use some or all of the input data to establish zones, which are geographical sales regions. A zone may be a geographical area that covers one or more transaction locations, where a transaction location may include zero or more physical stores and zero or more addresses or zip codes used by customers when making purchases through virtual (e.g., online) channels. For example, a first zone may include two stores in the Atlanta metro area as well as numerous homes of customers who purchased online in or around the Atlanta metro area. Various clustering mechanisms, such as K-means clustering, exist in the art for dividing special data into regions, and such mechanisms may be used for establishing zones based on the input data.

By accounting for the SFS phenomenon through jointly modeling customer choices across channels to allow switching, and applying a SFS inventory effect feature only for brick choice to capture asymmetry, demand for both channels can be more accurately predicted during the clearance period. The method incorporates SFS effects within OCPi optimization in a computationally tractable manner. Thus, more profitable inventory partitions are generated by reducing the over-allocation to walk-in customers. The introduction of inventory decision variables in the OCPi formulation to manage SFS-effect induced nonconvexity and apply a specific reformulation to recover a linear MIP provides the ability to automate the estimation of cross-channel fulfillment effect on future sales for a wide range of impact scenarios and maximizes profits by preserving high-value inventory, clearing low-value inventory, and reducing shortages.

Figure 4:
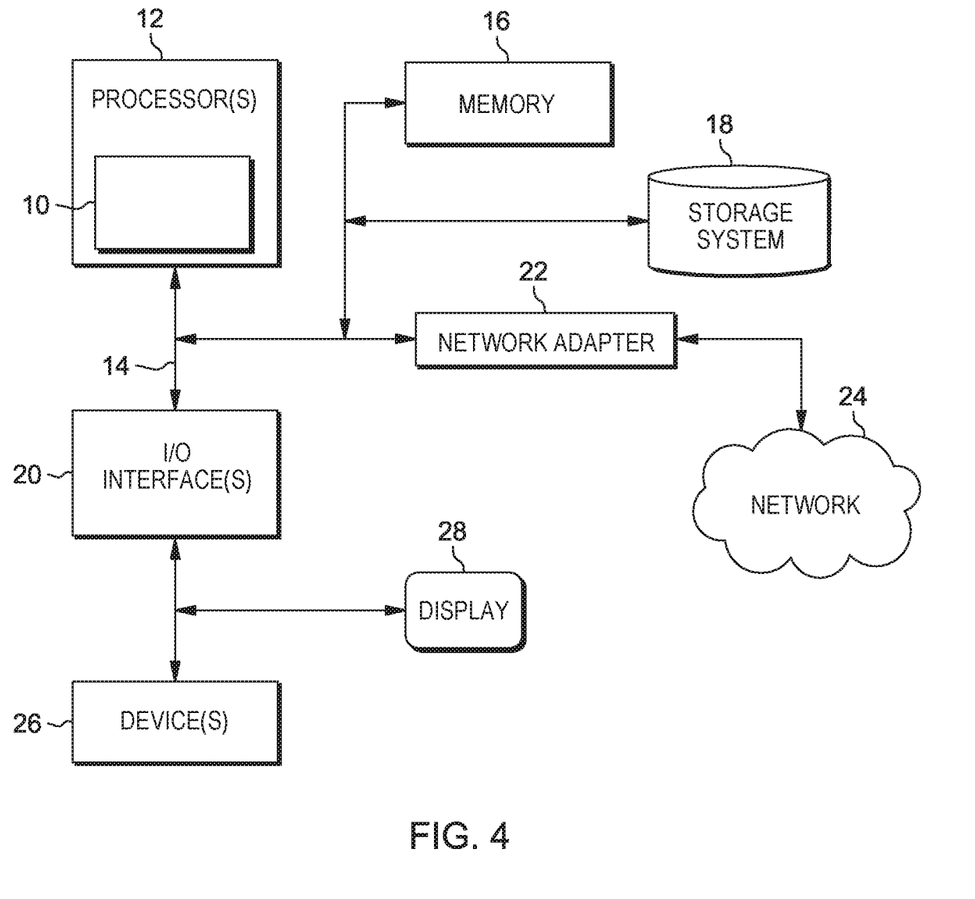
FIG. 4 illustrates a schematic of an example computer or processing system that may implement the system and methods in the embodiments of the present disclosure.

FIG. 4 illustrates a block diagram of a computer system 10 for use in implementing a planning system or method according to some embodiments. The planning systems and methods described herein may be implemented in hardware, software (e.g., firmware), or a combination thereof in order to achieve the calibration, prediction and optimization goals. In particular, computer system 10 may include an effective mixed-integer programming (MIP) solution package, e.g., IBM ILOG CPLEX. MIP solvers have significant memory and processing requirements and is implemented on high-speed, shared memory parallel processing hardware.

The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the calibrating, planning and optimizing methods described herein. A processing module 10 having instructions employing the methods herein may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, and external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for a network comprising multiple physical stores or warehouses configured for storing an inventory of a product, said inventory being shared to fulfill demand by at least an on-line sales channel and a physical store sales channel at distributed locations, said method comprising:
   receiving, at a processor unit, historical sales transaction data related to sales and shipment of a product at one or more said multiple physical stores or warehouses;
   determining, using the processor unit, a decay value representing a channel switching behavior based on an amount of on-line sales channel orders being fulfilled using the inventory of the product at physical stores;
   modifying an inventory level of the product at a location using said decay value;
   applying a cross-channel thresholding function to the modified inventory level for said product at said physical stores;
   calibrating, using the processor unit, a demand model to forecast demand of the product for each of one or more on-line sales or physical store sales channels over which the product is sold, said calibrating based upon the modified inventory level;
   constructing an optimization model to jointly predict a demand and determine inventory effect values across all locations for a future period of time based on said calibrated demand model, said optimization model comprising a non-convex formulation as a result of the applied cross-channel thresholding function;
   solving said optimization model using a parallel processing solver unit; and
   generating, from an output of said solver unit, an optimized plan specifying, using the processor unit, at least one of allocation of the product across physical stores to satisfy future demand predictions for said product across said on-line sales channel and said physical store sales channels subject to said channel switching behavior, a partitioning of the product for virtual sales, and a pricing of the product.

2. The computer-implemented method of claim 1, wherein said calibrating comprises:
   calculating from said historical sales transaction data a historical ship-from-store (SFS) flow out of every physical store or warehouse location as a function of time (t), and computing a modified inventory level amount I'(t) as a function of time at a store according to:

$$I'(t)=I(t)-SFS(t)$$

where I(t) is an initial inventory level amount at a point in time, and SFS(t) is the calculated SFS product out flow from said store.

3. The computer-implemented method of claim 2, further comprising:
applying a cross-channel inventory effect function f( ) to the modified inventory level I'(t) for said product at said store, said f( ) being said non-linear thresholding function; and
modifying said demand model based on said applied a cross-channel inventory effect function f(I'(t)), said modified demand model used in said predicting demand for said product at said store for a period of time.

4. The computer-implemented method of claim 3, further comprising:
computing a partition of store inventory using the applied cross-channel inventory effect thresholding function based on said demand predictions at said sales location.

5. The computer-implemented method of claim 3, wherein said demand model is an attraction-based model, said modifying said demand model based on said applied cross-channel inventory effect function f(I'(t)) comprising:

$$\text{computing } A'_{brick}(t)=A_{brick}(t)+\beta f(I'(t)),$$

where $A'_{brick}(t)$ is a multivariable function representing a retailer's attractiveness for a physical retail sales channel $A_{brick}(t)$ as reduced by said applied inventory effect function and $\beta$ is a coefficient representing a sensitivity of channel attractiveness to inventory level.

6. The computer-implemented method of claim 5, further comprising modeling a demand level for said product through said physical retail sales channel from a starting time period as:

$$\text{Predicted } D_B(t)=M(t)\exp(A'_{brick}(t))/1+\exp(A'_{brick}(t))+\exp(A'_{online}(t)); \text{ and}$$

modeling a demand level for said product through said on-line sales channel from a starting time period as:

$$\text{Predicted } D_O(t)=M(t)\exp(A'_{online}(t))/1+\exp(A'_{brick}(t))+\exp(A'_{online}(t))$$

where M(t) is a market demand size model, and $A'_{online}(t)$ represents an attractiveness level relating to a customer's preference to or order the product via on-line sales channel.

7. The computer-implemented method of claim 6, wherein to construct said omni-channel sales prediction and fulfillment optimization model comprises:
creating a function that comprises a piecewise linear function of available inventory;
incorporating said piecewise linear function in an optimization model program to generate a discrete optimization problem; and
solving said discrete optimization problem using a mixed integer programming solver unit.

8. The computer-implemented method of claim 7, wherein said creating a piecewise linear function comprises:
specifying a piecewise linear store inventory decision variable z(I, t), where $z_{it}=1$ if effective inventory level I'(t) is $\bar{I}_{it}$ where i represents a store of said physical retail sales channel network and z represents a Special Ordered Set type-2 (SOS-2) variable;

computing $I'(t)=\text{sum}(i) z_{it} \bar{I}_{it}$, where i represents a store of said sales channel network, wherein for each $\bar{I}_{it}$, specifying demand values $D_B(t)$ for said physical retail sales and $D_O(t)$ for said on-line channel as piecewise linear function of z(I, t).

9. A system comprising:
a network comprising multiple physical stores or warehouses configured for storing an inventory of a product, said inventory being shared to fulfill demand by at least an on-line sales channel and a physical store sales channel at distributed locations;
a memory storage device; and
a hardware processor in communication with said memory storage device, the hardware processor configured to:
receive historical sales transaction data related to sales and shipment of a product at one or more said multiple physical stores or warehouses;
determine a decay value representing a channel switching behavior based on an amount of on-line sales channel orders being fulfilled using the inventory of the product at physical stores;
modify an inventory level of the product at a location using said decay value;
apply a cross-channel thresholding function to the modified inventory level for said product at said physical stores;
calibrate a demand model to forecast demand of the product for each of one or more on-line sales or physical store sales channels over which the product is sold, said calibrating based upon the modified inventory level;
construct an optimization model to jointly predict a demand and determine inventory effect values across all locations for a future period of time based on said calibrated demand model, said optimization model comprising a non-convex formulation as a result of the applied cross-channel thresholding function;
solve said optimization model using a parallel processing solver unit; and
generate, from an output of said solver unit, an optimized plan specifying at least one of allocation of the product across physical stores to satisfy future demand predictions for said product across said on-line sales channel and said physical store sales channels subject to said channel switching behavior, a partitioning of the product for virtual sales, and a pricing of the product.

10. The computer system of claim 9, wherein to calibrate, said hardware processor is further configured to:
calculate from said historical sales transaction data a historical ship-from-store (SFS) flow out of every physical store or warehouse location as a function of time (t), and computing a modified inventory level amount I'(t) as a function of time at a store according to:

$$I'(t)=I(t)-SFS(t)$$

where I(t) is an initial inventory level amount at a point in time, and SFS(t) is the calculated SFS product out flow from said store.

11. The computer system of claim 10, wherein said hardware processor is further configured to:
apply a cross-channel inventory effect function f( ) to the modified inventory level I'(t) for said product at said store, said f( ) being said non-linear thresholding function; and modify said demand model based on said applied a cross-channel inventory effect function f(I'(t)), said modified demand model used in said predicting demand for said product at said store for a period of time.

12. The computer system of claim 11, wherein said hardware processor is further configured to:
compute a partition of store inventory using the applied cross-channel inventory effect function based on said demand predictions at said sales location.

13. The computer system of claim 11, wherein said demand model is an attraction-based model, wherein to modify said demand model based on said applied cross-channel inventory effect function f(I'(t)), said hardware processor is further configured to:

compute $A'_{brick}(t) = A_{brick}(t) + \beta f(I'(t))$, where $A'_{brick}(t)$ is a multivariable function representing a retailer's attractiveness for a physical retail sales channel $A_{brick}(t)$ as reduced by said applied inventory effect function and $\beta$ is a coefficient representing a sensitivity of channel attractiveness to inventory level.

14. The computer system of claim 13, wherein said hardware processor is further configured to:
model a demand level for said product through said physical retail sales channel from a starting time period as:

Predicted $D_B(t) = M(t) \exp(A'_{brick}(t))/1 + \exp(A'_{brick}(t)) + \exp(A'_{online}(t))$; and model a demand level for said product through said on-line sales channel from a starting time period as:

Predicted $D_O(t) = M(t) \exp(A'_{online}(t))/1 + \exp(A'_{brick}(t)) + \exp(A'_{online}(t))$ where M(t) is a market demand size model, and $A'_{online}(t)$ represents an attractiveness level relating to a customer's preference to or order the product via on-line sales channel.

15. The computer system of claim 14, wherein to construct said omni-channel sales prediction and fulfillment model comprises:
creating a function that is comprises a piecewise linear function of available inventory;
incorporating said piecewise linear function in an optimization model program to generate a discrete optimization problem; and
solving said discrete optimization problem using a mixed integer programming solver unit.

16. The computer system of claim 15, wherein to create said piecewise linear function, said hardware processor is further configured to:
specify a piecewise linear store inventory decision variable z(I, t), where $z_{it}=1$ if effective inventory level I'(t) is $\bar{I}_{it}$ where i represents a store of said physical retail sales channel network and z represents a Special Ordered Set type-2 (SOS-2) variable;
compute $I'(t) = \text{sum}(i) \, z_{it} \, \bar{I}_{it}$, where i represents a store of said sales channel network, wherein for each $\bar{I}_{it}$, specifying demand values $D_B(t)$ for said physical retail sales and $D_O(t)$ for said on-line channel as piecewise linear function of z(I, t).

17. A computer program product for a network comprising multiple physical stores or warehouses configured for storing an inventory of a product, said inventory being shared to fulfill demand by at least an on-line sales channel and a physical store sales channel at distributed locations, the computer program product comprising a computer-readable storage medium having a computer-readable program stored therein, wherein the computer-readable program, when executed on a computer system comprising at least one processor, causes the processor to perform:
receiving, at a processor unit, historical sales transaction data related to sales and shipment of a product at one or more said multiple physical stores or warehouses;
determining, using the processor unit, a decay value representing a channel switching behavior based on an amount of on-line sales channel orders being fulfilled using the inventory of the product at physical stores;
modifying an inventory level of the product at a location using said decay value;
applying a cross-channel thresholding function to the modified inventory level for said product at said physical stores;
calibrating, using the processor unit, a demand model to forecast demand of the product for each of one or more on-line sales or physical store sales channels over which the product is sold, said calibrating based upon the modified inventory level;
constructing an optimization model to jointly predict a demand and determine inventory effect values across all locations for a future period of time based on said calibrated demand model, said optimization model comprising a non-convex formulation as a result of the applied cross-channel thresholding function;
solving said optimization model using a parallel processing solver unit; and
generating, from an output of said solver unit, an optimized plan specifying, using the processor unit, at least one of allocation of the product across physical stores to satisfy future demand predictions for said product across said on-line sales channel and said physical store sales channels subject to said channel switching behavior, a partitioning of the product for virtual sales, and a pricing of the product.

18. The computer program product of claim 17, wherein said calibrating comprises:
calculating from said historical sales transaction data a historical ship-from-store (SFS) flow out of every physical store or warehouse location as a function of time (t), and computing a modified inventory level amount I'(t) as a function of time at a store according to:

$$I'(t) = I(t) - SFS(t)$$

where I(t) is an initial inventory level amount at a point in time, and SFS(t) is the calculated SFS product out flow from said store; and
applying a cross-channel inventory effect function f( ) to the modified inventory level I'(t) for said product at said store, said f( ) being said non-linear thresholding function; and
modifying said demand model based on said applied a cross-channel inventory effect function f(I'(t)), said modified demand model used in said predicting demand for said product at said store for a period of time.

19. The computer program product of claim 18, further comprising modeling a demand level for said product through said physical retail sales channel from a starting time period as:

Predicted $D_B(t) = M(t) \exp(A'_{brick}(t))/1 + \exp(A'_{brick}(t)) + \exp(A'_{online}(t))$; and model a demand level for said product through said on-line sales channel from a starting time period as:

Predicted $D_O(t) = M(t)\exp(A'_{online}(t))/1+\exp(A'_{brick}(t))+\exp(A'_{online}(t))$ where M(t) is a market demand size model, $A'_{brick}(t)$ is a multivariable function representing a retailer's attractiveness for a physical retail sales channel $A_{brick}(t)$ as reduced by said applied inventory effect function, and $A'_{online}(t)$ represents an attractiveness level relating to a customer's preference to or order the product via on-line sales channel.

20. The computer program product of claim 19, wherein said constructing said omni-channel sales prediction and fulfillment model comprises:
    creating a function that comprises a piecewise linear function of available inventory;
    incorporating said piecewise linear function in an optimization model program to generate a discrete optimization problem; and
    solving said discrete optimization problem using a mixed integer programming solver, said creating a piecewise linear function comprising:
        specifying a piecewise linear store inventory decision variable z(I, t), where $z_{it}=1$ if effective inventory level I'(t) is $\bar{I}_{it}$ where i represents a store of said physical retail sales channel network and z represents a Special Ordered Set type-2 (SOS-2) variable;
        computing I'(t)=sum(i) $z_{it} \bar{I}_{it}$, where i represents a store of said sales channel network, wherein for each $\bar{I}_{it}$, specifying demand values $D_B(t)$ for said physical retail sales and $D_O(t)$ for said on-line channel as piecewise linear function of z(I, t).

* * * * *